United States Patent [19]

Witek et al.

[11] Patent Number: 5,043,886
[45] Date of Patent: Aug. 27, 1991

[54] LOAD/STORE WITH WRITE-INTENT FOR WRITE-BACK CACHES

[75] Inventors: Richard T. Witek, Littleton; George M. Uhler, Marlborough, both of Mass.

[73] Assignee: Digital Equipment Corporation, Maynard, Mass.

[21] Appl. No.: 245,263

[22] Filed: Sep. 16, 1988

[51] Int. Cl.⁵ ............................................. G06F 13/00
[52] U.S. Cl. .................... 364/200; 364/228.1; 364/228.3; 364/243.4; 364/243.41; 364/243.44
[58] Field of Search ..................... 364/300, 200, 900

[56] References Cited

U.S. PATENT DOCUMENTS

| | | | |
|---|---|---|---|
| 4,394,731 | 7/1983 | Flusche et al. | 364/200 |
| 4,442,487 | 4/1984 | Fletcher et al. | 364/200 |
| 4,445,174 | 4/1984 | Fletcher | 364/200 |
| 4,484,267 | 11/1984 | Fletcher | 364/200 |
| 4,503,497 | 3/1985 | Krygowski et al. | 364/200 |
| 4,691,282 | 9/1987 | Kinoshita | 364/200 |
| 4,885,680 | 12/1989 | Anthony et al. | 364/200 |

OTHER PUBLICATIONS

Dubois and Briggs, "Effects of Cache Coherency in Multiprocessors", IEEE Transactions on Computers, vol. C-31, No. 11, Nov. 1982.

*Primary Examiner*—Gareth D. Shaw
*Assistant Examiner*—Matthew C. Fagan
*Attorney, Agent, or Firm*—Kenyon & Kenyon

[57] ABSTRACT

A method for reading data blocks from main memory by central processing units in a multiprocessor system containing write-back caches. Load or gather instructions contain a write-intent flag. The status of the write-intent flag is determined. It is also determined whether a data block requested in the instruction by one of the processors is located in a corresponding cache, and if so, the requested data block is returned to the processor. If the data block is not in the cache and the write-intent flag indicates that the block will not be modified, the data block is read from main memory without obtaining a write privilege. The requested data block is subsequently returned from the cache to the processor. If the data block is not in the cache and the write-intent flag indicates the data block will be modified by the processor, then the data block is read from main memory while obtaining the write privilege. Subsequently, the requested data block is returned from the cache to the processor.

2 Claims, 3 Drawing Sheets

LOAD/STORE WITH WRITE-INTENT FOR WRITE-BACK CACHES

FIELD OF THE INVENTION

The present invention relates to the field of multiprocessor computer systems, and more particularly, to a method for reading data from main memory by central processing units in a multiprocessor system containing write-back caches.

BACKGROUND OF THE INVENTION

Modern day computer systems frequently comprise a central processing unit and a memory hierarchy including a relatively large, but relatively slow main memory and a relatively fast, but relatively small cache memory coupled between the central processing unit and the main memory. The data and instructions currently being processed by the central processing unit are temporarily stored in the cache memory to take advantage of the high speed of operation of the cache memory to thereby increase the overall speed of operation of the central processing unit. The use of a cache memory is based upon the principles of temporal locality and spatial locality. More specifically, when a central processing unit is referring to data and instructions from a particular space within physical memory, it will most probably, once again, refer to the data and instructions from that space and also, refer to the data and instructions from contiguous space, for a certain period of time. Accordingly, data blocks within the contiguous space of physical memory where data being utilized by the central processing unit resides, are placed in the cache memory to greatly decrease the time required to fetch data and instructions from those frequently referred to data blocks.

A cache memory scheme may be either a write-through cache or a write-back cache. In a write-through cache, a central processing unit writes through to main memory whenever it writes to an address in cache memory. In a write-back cache, the central processing unit does not update the main memory at the time of writing to its cache memory but updates the memory at a later time. For example, when the central processing unit is changing the contents of its cache memory, it will send the latest copy of written-to data to the main memory before it refills the space within the cache occupied by the written-to data. In this manner, the speed of operation of the central processing unit is not slowed down by the time that would be required to update the main memory after each write operation. Instead, the main memory is updated at the completion of all operations relating to the data block contained in the cache memory.

Many computer systems operate on the basis of the concept of a single, simple copy of data. In a multi-processor system including several central processing units, each with its own write-back cache, incoherencies within the data arise when one of the central processing units writes to a data block in its cache memory. In other words, when a particular central processing unit writes to its cache, the main memory will not have a valid copy of the data until the central processing unit updates the main memory.

Some computer systems require that a central processing unit obtain the "privilege" to perform a write before modifying a data block. For purposes of the following discussion, this so-called write privilege will be considered the same as a concept termed "ownership" and both will be described under the term "ownership".

If a particular central processing unit requests a data block currently in the cache of another central processing unit of the multi-processor system and that data block has been written to by such other central processing unit on a write-back basis, as described above, a coherency scheme must be utilized to insure that the latest copy of the data is sent to the requesting central processing unit. For example, some known multi-processor systems have implemented a so-called "snoopy" protocol in a shared bus configuration for the several central processing units of the system to assure that the latest copy of a data block is sent to a requesting central processing unit.

Pursuant to the snoopy protocol, all of the central processing units of the multi-processor system are coupled to the main memory through a single, shared bus. Each of the caches of the several central processing units and any other devices coupled to the shared bus "snoop" on (i.e., watch or monitor) all transactions with main memory by all of the other caches. Thus, each of the caches is aware of all data blocks transferred from main memory to the several other caches throughout the multiprocessor system. Inasmuch as the caches are coupled to the main memory by a single, shared bus, it is necessary to implement an arbitration mechanism to grant access to the shared bus to one of possibly several devices requesting access at any particular time. The arbitration mechanism will effectively serialize transactions with the main memory and the snoopy protocol utilizes the serialization to impose a rule that only one cache at a time has permission to modify a data block.

After modification of the data block in the one cache, the main memory does not contain a valid copy of the data until it is updated by the cache having the written-to block, as described above. In accordance with the snoopy protocol, the copy of the written to data block in the one cache is substituted for the main memory copy whenever another cache requests that data block prior to the update of the main memory.

An ownership model of the snoopy protocol includes the concept of "ownership" of a data block. A device must first request and obtain ownership of a data block in its cache before it can write to that data block. At most, one device can own a data block at any one time and the owner always has the valid copy of that data block. Moreover, the owner must update the main memory before it relinquishes ownership of the block to assure coherency of the data throughout the multi-processor system.

In the following description, ownership is defined as the right to modify (or write to) a data block. When no device of the system owns a data block it is said to be owned by the main memory and copies of the data block may be "shared" by any of the devices of the system. A shared mode means the device has read only access to a shared copy of a data block residing in its cache. Since the main memory owns the data block in the shared mode, all shared copies exactly match the main memory and are, hence, correct copies. Once any one device other than main memory obtains ownership of a data block, no other device may share the block and all copies of the data block which are shared are invalidated at the time ownership is obtained by the one device.

In some coherency protocols, there are two kinds of read commands that support the protocol. The first command (hereinafter a "read-only") requests a read-only copy of a shared data block from memory. This copy can not be modified. The second command (hereinafter a "read-for-ownership") requests a copy of a data block from memory that may be written or modified.

When a data block has been originally requested with the read-only command, and the central processing unit subsequently wants to write or modify the data block, the processing unit must rerequest the data block with the read-for-ownership command. The processing unit can only modify the data block once it gains ownership of the data block.

Most vector architectures (and some scalar architectures) use a load/store execution model in which data must first be read ("loaded") from memory or the cache into registers in the central processing unit. The data is manipulated in these registers and then written back to memory ("stored").

Many vectorizable algorithms involve the reading of a vector from locations in memory, modification of the vector, and writing the modified vector back to the same memory locations. The load and store used to read and write the vector are separate operations. This makes it difficult for the hardware to generate a read-for-ownership command for the vector load. As a result, a vector algorithm as described above causes two reads for each vector. One read of data is done with the read-only command while another read is done with the read-for-ownership command in order to gain ownership of each block of the vector as it is written back to memory. This causes a significant performance penalty in the execution of such algorithms.

The generation of two reads is avoidable by reading all vector data blocks initially, at the time of the load operation, with the read-for-ownership command. This assumes that the data will be written later for all data blocks. However, reading for ownership obligates the reading central processing unit to write the data back to main memory at some later time, even if the data is not modified. Since a significant amount of vector data is never modified, reading all data with read-for-ownership commands trades the problem of increased read traffic for the problem of increased write-back traffic.

SUMMARY OF THE INVENTION

The present invention solves the above problems for a multiprocessor system with write-back caches by providing a mechanism for controlling a central processing unit to use the appropriate command to load data into the central processing unit. In other words, if the vector will be written, a read-for-ownership command is used. If the vector will not be written, a read-only command is used.

More particularly, the present invention provides a method for reading data blocks from memory by central processing units in a multiprocessor system containing write-back caches coupled between the main memory and the central processing units. The method comprises determining the status of a write-intent flag of an instruction. It is determined whether a data block requested in the instruction by one of the central processing units is located in a corresponding cache. The requested data block is returned to the central processing unit when the data block is located in the cache. The requested data block is sent to the cache from the main memory without obtaining a write privilege for the data block when the requested data block is not in the cache and the write-intent flag indicates the data block will not be modified. Subsequently, the requested data block is returned to the central processing unit from the cache. The requested data block is sent to the cache from main memory and the write privilege is obtained for that data block when the requested data block is not located in the cache and the write-intent flag indicates that the data block will be modified by the central processing unit. The requested data block is subsequently returned to the central processing unit from the cache.

In another embodiment of the invention, when the requested data block is located in the cache, along with the return of the requested data block to the central processing unit, the requested data block is simultaneously sent to the cache from the main memory to obtain a write privilege for the data block. This occurs when the cache does not have the write privilege to the requested data block and the write-intent flag indicates the requested data block will be modified.

The embodiments of the present invention enhance the performance of multiprocessor systems with write-back caches by providing the information needed to use the appropriate command to read data. This eliminates wasteful read or write-back traffic.

DETAILED DESCRIPTION

Figure 1:
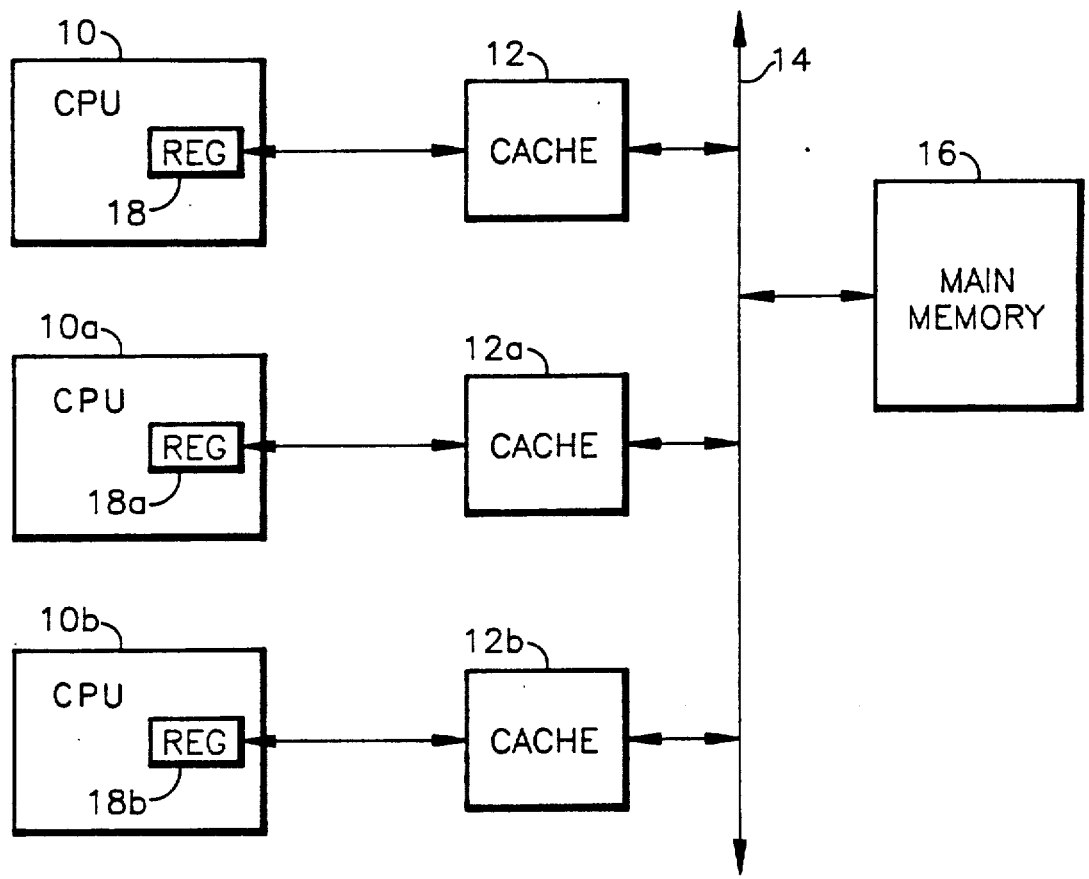
FIG. 1 is a simplified block diagram of a multiprocessor system.

FIG. 1 shows an embodiment of a multiprocessor system in which the present invention can be used. The system has a plurality of central processing units 10, 10a, 10b (hereinafter CPU's). Each CPU 10-10b is coupled to its own separate memory cache 12, 12a, 12b. The caches 12-12b are each coupled to a main memory 16 through a common bus 14. Although a common bus 14 is illustrated in FIG. 1, the present invention is also useful when the caches 12, 12a, 12b are coupled to the main memory 16 by point-to-point connections, instead of by a shared bus.

In the illustrated embodiment, the CPUs 12, 12a, 12b respectively contain registers 18, 18a and 18b. It is in these registers 18, 18a, 18b that data is manipulated in the CPUs 10, 10a, 10b.

The basic operation of the system is as follows. When a CPU (10, for example) is to perform an instruction, such as A=A+4, a compiler (not shown) creates a series of operations for the CPU 10 to follow. Using a load/store execution model, these could be, for example:

a) Load A, RO
b) Add #4, RO
c) Store RO, A

The first operation, Load A, RO, loads the data block from memory location A into register RO. The CPU will first attempt to obtain the corresponding data block from its cache 12. If the data block is in the cache 12 (a cache hit), the data block is returned to the CPU 10. The use of a cache 12 can increase speed for memory references by a CPU since it is a relatively small but closer memory compared to the main memory.

If the cache 12 does not contain the appropriate data block for memory location A (a cache miss), this data block must be obtained from main memory 16 via bus 14. Once the cache 12 has received the requested data block, this data block can be loaded into register RO of the CPU 10, where the integer 4 is added to the contents of the data block. This is operation b).

Thus modified, the data block is then written back (stored) to the cache 12 into location A from the register RO. This is operation c). At some point, main memory must be apprised of the modification to the data block in memory location A. In write-through caches, this is done when the store is made to the cache. With write-back caches, such as those used in the present invention, the updating of main memory is done at a later time, after the store has been made to the cache.

Cache coherency must be maintained for the system. In other words, if a CPU has modified or will modify a data block, the remaining CPU's cannot access that data block until after it has been modified and written back to main memory. This insures that a CPU will not use an outdated data block. With a write-through cache, the main memory will be updated as the cache receives the modified data block. With write-back caches, however, a problem arises due to the main memory being updated later than the cache. Incoherency would result from a CPU operating on a data block accessed from main memory or its cache that has already been modified by another CPU but not yet updated in main memory.

To prevent incoherencies from occurring, the illustrated system uses an ownership scheme. In this scheme, a data block can be shared or owned. A shared data block can be accessed by all the CPUs 10-10b from main memory 16, the copies of this shared data block being read-only copies. When a CPU wants to obtain a copy of a data block that it intends to modify, it must obtain a read-write copy of that data block. The CPU is said to obtain ownership of the data block when it obtains the read-write copy. All of the other CPUs are then prevented from obtaining copies both read-only and read-write types, of that data block.

Further, any copies that happen to be in the caches of the other CPUs are invalidated, so that the only valid copy of the owned data block is in the CPU and cache that requested ownership of that data block.

By obtaining ownership of a data block, a CPU has essentially obtained the privilege to write to that block. The present invention is also useful in systems which are not based on ownership, but also have a write privilege that must be obtained before writing to a data block.

Referring back to the example instruction $A = A + 4$, assume that the load operation (Load A, RO) is performed by a read-only command. After the addition in the registers, the result cannot be stored into memory location A since the CPU lo does not have ownership of the data block A, but instead has a read-only copy. In order to perform the store operation, the CPU 10 must request and obtain a read-write copy of the data block from main memory 16. Once the CPU 10 obtains ownership of the data block, it has the privilege to modify that data block and can therefore perform the store operation.

As one can surmise from this example, initially using a read-only command that requests a read-only copy when the data block will be modified, causes a performance decrease since another read (this time a read-for-ownership) must be performed before storing the data block.

A way to avoid this problem for the above example instruction is to do every read with a read for ownership command. However, that solution has its own problems, as illustrated by the following example of an instruction, $B = A + 4$. The compiler generates for this instruction the following operations:

a) Load A, RO
b) Add #4, RO
c) Store RO, B

In this example, A is not being modified, only B is modified However, since the Load A, RO operation is performed with the read-for-ownership command, the CPU 10 must eventually write back the data block A to the main memory 16, as well as writing back modified data block B. There is therefore increased and unnecessary write-back traffic when every read is done with a read-for-ownership command.

The present invention provides a method by which the CPU is informed by the compiler for each instruction whether a data block will be modified and written back so that the data block can be read-only with the correct command (read or read-for-ownership) This method thereby substantially avoids excess read traffic or write-back traffic.

Figure 2:
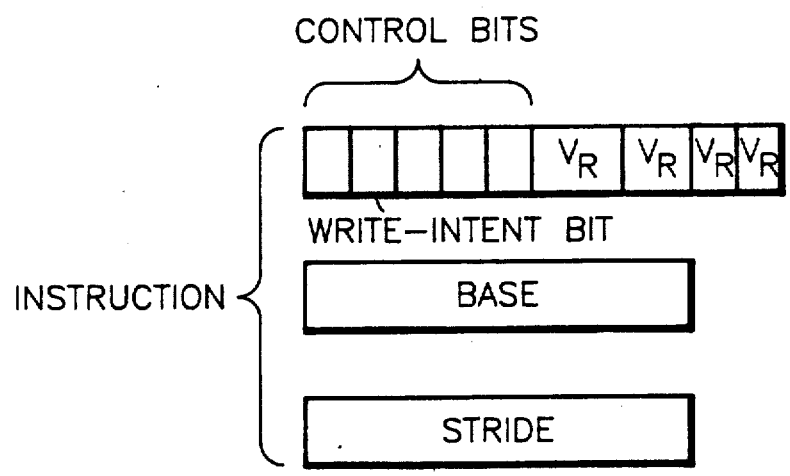
FIG. 2 is an illustration of the fields of an instruction used in the present invention for the system of FIG. 1.

The method involves providing a bit (or flag) designated as a write-intent bit (or flag) with each load or gather instruction. The fields of a vector load or gather instruction are shown in FIG. 2. They include control bits, the instruction portion, the base and the stride. The base and the stride relate to vector instructions and are well known in the art of vector processing.

The write-intent bit is located among the control bits for the instructions. Using well-known techniques for vectorizing code, the compiler has enough information to set the write-intent bit. When this bit is set in a vector load or gather instruction by the compiler, the load command generated by the CPU will be a read-for-ownership command rather than simply a read command Therefore, when the data is modified and stored, an additional read-for-ownership command will not have to be generated before the data is modified.

When the write-intent bit is not set in a load or gather instruction by the compiler, the load command generated by the CPU will be a read-only command. This would indicate that the data block will not be modified by subsequent instructions.

Figure 3:
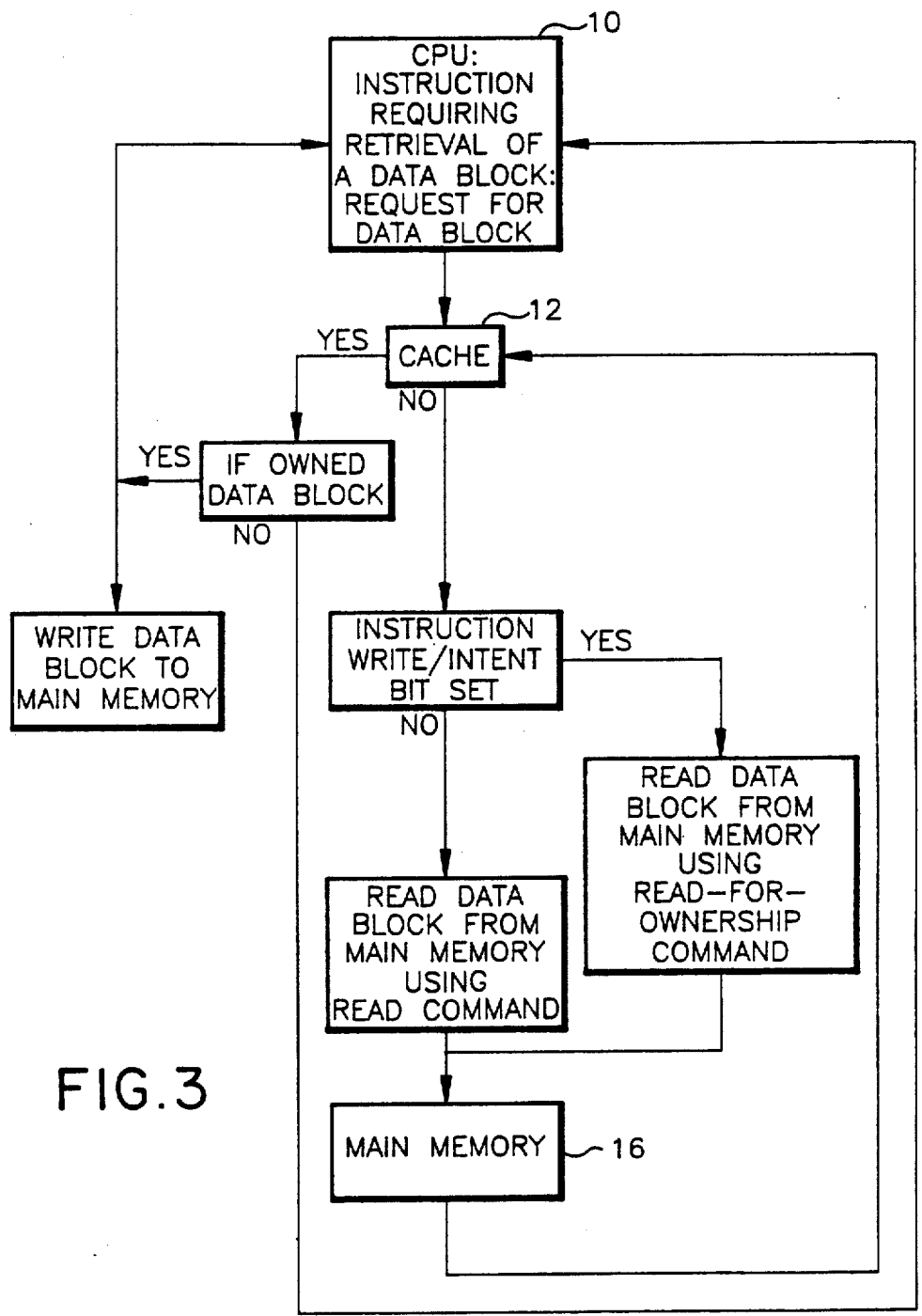
FIG. 3 is a flow diagram representative of a first embodiment of the method of the present invention.

Referring to FIG. 3, an example of a simplified cache control flow for an instruction which reads data is as follows:

1. If the requested data is in the cache, go to step 5.
2. If the cache block that is selected for replacement contains owned data, write the block to memory.
3. If the write-intent bit is set, read the data block from memory using a read-for-ownership command to load the data into the selected cache block. Go to step 5.
4. If the write-intent bit is not set, read the data block from memory using a read-only command to load the data into the selected cache block. Go to step 5.
5. Return the requested data to the CPU.

Thus, if the data block is not already in the cache 12, it is read from main memory 16 with the command appropriate for the state of the write-intent bit. Once the data block is owned by the cache 12, subsequent load instructions cause the cache 12 to return the data block to the CPU 10, independent of the state of the write-intent bit. A subsequent write to a block that is already owned will simply cause the data block to be written to the cache 12.

Figure 4:
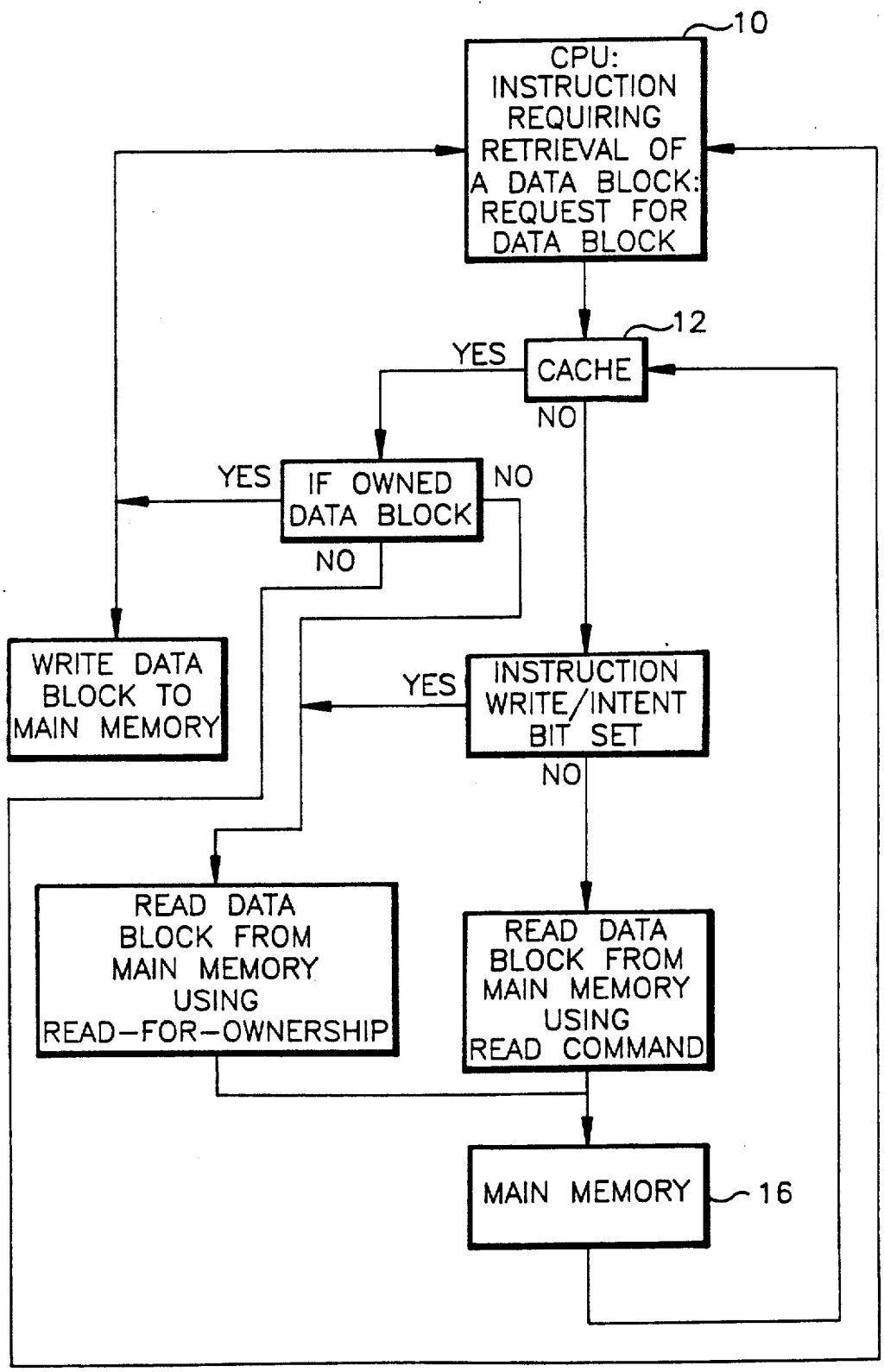
FIG. 4 is a flow diagram representative of a second embodiment of the method of the present invention.

If the data block is already in the cache 12 (cache hit), it is returned to the CPU. Referring to FIG. 4, a second embodiment of the method is shown that may be used with cache hits. After this return of the cached data block to the CPU upon a cache hit, the data block is also read from main memory 16 using a read-for-ownership command if the cached data block is not already owned and the write-intent bit is set. This starts the ownership request in parallel with the processing of the data and typically obtains ownership before the subsequent store (indicated by the write-intent bit) occurs.

According to the present invention, the instructions themselves contain the information (the write-intent bit) to direct the choice of command to read data blocks. This allows ownership of the data blocks to be obtained before a subsequent store occurs. Since a data block is already owned, the subsequent store runs at full speed without stopping to obtain ownership of the data block.

What is claimed is:

1. A method for acquiring data blocks from a shared main memory by central processing units in a multiprocessor system, the system having a separate write-back cache coupled between each central processing unit and the shared memory, the method comprising the steps of:
   (a) determining at one of the central processing units a state of a write-intent flag of an instruction to be executed by that one central processing unit;
   (b) executing the instruction by the one central processing unit and determining whether a data block requested by the instruction is located in the write-back cache associated with the one central processing unit;
   (c) sending the data block from the associated write-back cache to the one central processing unit when the data block is located in the associated write-back cache;
   (d) sending the data block without a write privilege from the shared main memory to the associated write-back cache when the data block is not located in the associated write-back cache and the state of the write-intent flag indicates that the data block is not to be later modified by the one central processing unit after execution of the instruction, and subsequently sending the data block from the associated write-back cache to the one central processing unit; and
   (e) sending the data block with a write privilege from the shared main memory to the associated write-back cache when the data block is not located in the associated write-back cache and the state of the write-intent flag indicates that the data block is to be later modified by the one central processing unit after execution of the instruction, and subsequently sending the data block from the associated write-back cache to the one central processing unit.

2. A method for acquiring data blocks from a shared main memory by central processing units in a multiprocessor system, the system having a separate write-back cache coupled between each central processing unit and the shared memory, the method comprising the steps of:
   (a) determining at one of the central processing units a state of a write-intent flag of an instruction to be executed by that one central processing unit;
   (b) executing the instruction by the one central processing unit and determining whether a data block requested by the instruction is located in the write-back cache associated with the one central processing unit;
   (c) sending the data block from the associated write-back cache to the one central processing unit when the data block is located in the associated write-back cache;
   (d) simultaneously with step (c), sending a copy of the data block with a write privilege from the shared main memory to the associated write-back cache when the data block is located in the associated cache and is without a write privilege, and when the state of the write-intent flag indicates that the data block will be later modified by the one central processing unit after execution of the instruction,
   (e) sending the data block without a write privilege from the shared main memory to the associated write-back cache when the data block is not located in the associated write-back cache and the state of the write-intent flag indicates that the data block is not to be later modified by the one central processing unit after execution of the instruction, and subsequently sending the data block from the associated write-back cache to the one central processing unit; and
   (f) sending the data block with a write privilege from the shared main memory to the associated write-back cache when the data block is not located in the associated write-back cache and the state of the write-intent flag indicates that the data block is to be later modified by the one central processing unit after execution of the instruction, and subsequently sending the data block from the associated write-back cache to the one central processing unit.

* * * * *